Nov. 19, 1935.   E. E. SLICK, JR   2,021,523
APPARATUS FOR FEEDING GLASS
Filed July 5, 1933
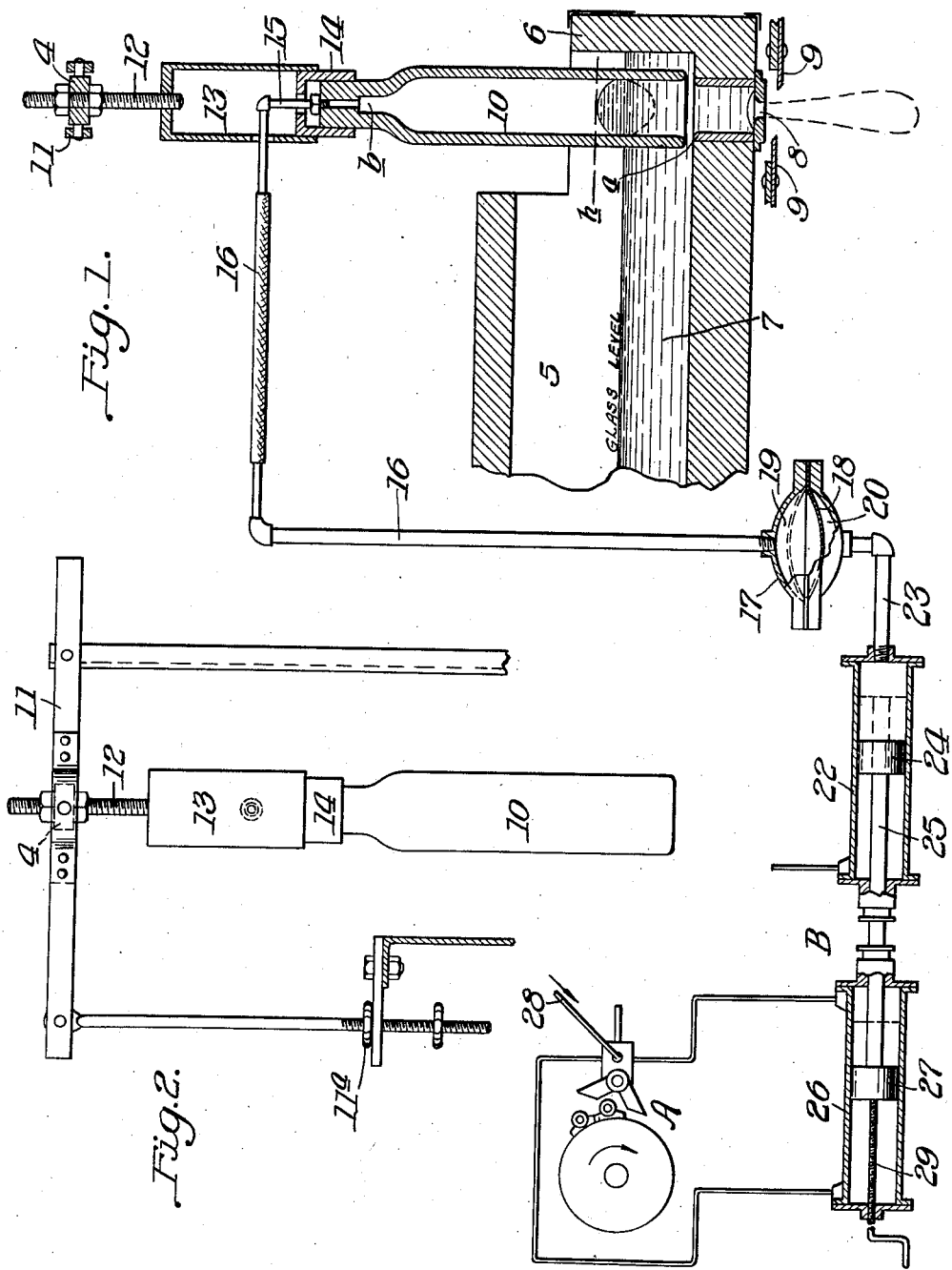
INVENTOR.
E. E. Slick Jr.
BY
ATTORNEY.

Patented Nov. 19, 1935

2,021,523

UNITED STATES PATENT OFFICE 2,021,523

APPARATUS FOR FEEDING GLASS

Edwin E. Slick, Jr., Pittsburgh, Pa.

Application July 5, 1933, Serial No. 679,060

7 Claims. (Cl. 49—55)

This invention relates to a new and improved method of and apparatus for feeding molten glass from the forehearth of a glass melting furnace or from a glass container to a mold or the like, for shaping into the desired article.

Various apparatus has been designed for accomplishing the ends above specified, a class of which is known as pneumatically operated feeders. It is to this latter class of feeders the present invention is particularly directed. In these feeders, as is well known in the art, the devices are designed to separate and deliver from the forehearth, through an orifice in the bottom, a suitable charge of glass in a form to be received by a mold associated with the orifice or outlet of the forehearth. The charge, mass, or gob of desired weight is forced out of the outlet, and is severed by shears, thus allowing the charge to be received by the mold.

The present invention comprises a method of and apparatus whereby the supply of glass from which the mold charges are taken, located either in the forehearth of a furnace or other container, is maintained at a high temperature considerably in excess of the present practice, in order that the charges may have a high degree of fluidity enabling rapid feeding, and of a sufficiently high temperature to prevent a partially chilled surface or skin forming on the charges prior to their delivery to the molds.

My invention contemplates the provision of means, in a glass feeding apparatus, for maintaining in a closed system a body of working fluid in contact with the glass above the outlet and in which the working fluid is subjected to the action of a displacement device for varying the pressure of the working fluid to create alternate pressure and vacuum or partial vacuum conditions within the closed system to intermittently effect an extrusion of the glass through the outlet, a stoppage of the discharge, and in some instances to draw back into the said outlet a portion of the extruded glass.

My invention also contemplates the association with the said pressure and vacuum creating means of adjustable means for controlling the flow of glass into the outlet means from the forehearth or glass container.

Another feature of my invention relates to the utilization of air under pressure in controlled and regulated quantities and pressures for actuating a diaphragm or displacement device embodied in and constituting a part of a closed system for containing and maintaining the aforesaid working fluid.

The present invention further contemplates means for providing a plurality of independent cooperating columns of fluids separated by a displacement device or diaphragm.

In the accompanying drawing, which illustrates an application of my invention:

Fig. 1 is a longitudinal sectional view taken through the forehearth of a glass furnace, showing my invention applied thereto;

Fig. 2, a detail elevational view of the suspension means for the adjustable feeder tube.

Referring to the drawing, 5 designates a portion of a glass melting furnace having an extension or forehearth 6, of the usual and well known construction, and 7 the glass which is to be supplied to the molds, etc. (not shown) in the form of gobs or charges through the outlet or orifice 8. As is usual in this class of glass feeders, shear blades, as 9, are preferably employed, the said blades being located and operated in a horizontal plane located at the proper distance below the outlet or orifice 8.

Disposed directly over the outlet 8 and designed to cooperate with the upper edge $a$ thereof in controlling the flow of glass into said outlet, I employ an elongated hollow vertically adjustable member or feeder tube 10. As illustrated and as preferred member 10 is suspended from a pivoted adjustable cross-bar 11 by means of a transversely pivoted member 4 carrying a suspension screw-bolt 12, member 13, and an apertured cap 14. The lower end of member 10 extends down below the maintained glass level in the furnace and forehearth, and, by a movement of member 11 by its adjusting nut 11$a$, member 10 may be raised and lowered relatively to the edge $a$ of the outlet to vary the distance therebetween to regulate the flow of glass into the outlet and into the submerged end of the hollow member. It will, of course, be understood that only a slight vertical adjustment of member 10 is necessary to vary the flow of glass from the forehearth into the outlet 8 and into the lower end portion of the hollow member 10.

The upper end of member 10 is contracted, as at $b$, and this contracted portion has a centrally disposed opening to receive a section 15 of a working fluid container. This fluid container or means for maintaining a working fluid in a closed system includes, as illustrated, the hollow member 10, pipe section 15, pipe line 16, a portion of a casing 17, and a flexible diaphragm 18, the latter being disposed in said casing in a manner to form chambers 19 and 20 therein. Necessary packing, it is obvious, should be employed in connection with the parts constituting the working fluid container to make it air tight.

The actuation of the flexible diaphragm to create the desired pressure and vacuum conditions within the closed working fluid container, and particularly within the hollow member 10 above the level of the glass, is effected as shown by controlled and regulated air pressures produced in a pumping device B having a cylinder 22 in open communication with the chamber 20 of casing 17, and with one face of the diaphragm through line 23. As shown, piston 24 of the cylinder 22 is driven by a piston rod 25 projecting from a second cylinder 26, the latter having a piston 27 therein. To effect the operation of piston 27 of cylinder 26, air under pressure from an air supply like 28, is alternately admitted and exhausted to and from cylinder 26 on opposite sides of the pistons 27, the frequency of operation of the piston 27 being controlled by a regulator or timing device, diagrammatically indicated at A, the construction and operation of which is well known in this art.

Adjustable means, comprising a threaded stem 29, are employed for regulating the travel of piston 27, which in turn controls the stroke of piston rod 25 and the piston 24 carried thereon.

In the practice of my invention, the glass in the forehearth or other container is maintained at a relatively high temperature and at a substantially constant level. Under my method, I am enabled to operate without pre-forming the charges prior to their delivery into the molds and without the disadvantages encountered heretofore, i. e., the formation of a skin on the surface of the charge or a portion thereof.

Upon starting the pump B, operating through its regulator A, air is first admitted to move the pistons 27 and 24 to the full-line positions of Fig. 1, thereby rarifying the actuating column of air or other fluid contained in line 23 and the chamber 20, creating a partial vacuum therein, which vacuum flexes the diaphragm 18.

The resulting displacement of said diaphragm in turn rarifies and creates a partial vacuum in the column of working fluid, such as air, contained in the chamber 19, lines 16, 15, and the feeder tube 10, causing the molten glass to rise in said tube, due to the pressure difference.

As the glass rises in the feeder tube, the volume of the working fluid column tends to decrease, due to the volume of the contained glass, which action, if permitted to continue, must eventually cause clogging or "freezing" of the glass in the passage $b$.

However, by the interposition of a free fluid-actuated diaphragm between the working and actuating columns of fluid, a balance is obtained between the pressures of the actuating fluid and that of the working fluid which will prevent the rise of glass above a certain level as $h$ in member 10.

In other words, due to the compensating movement of the diaphragm, a point of equilibrium is reached between the partial vacuum, the volumes of the respective columns of fluid, and the weight of the glass in the tube 10, at which point the glass comes to rest in the tube.

Approximately at the instant the glass reaches the level $h$, the regulator A acts to reverse the pump B and move the pistons 27 and 24 to the dotted-line positions of Fig. 1, imparting an increased or positive pressure to the actuating fluid column, which in turn flexes or displaces the diaphragm 18 in the reverse direction and creates a positive pressure on the working fluid column and a force on the glass within the hollow member 10 to aid gravity in extruding the charge through the outlet.

Attention is called to the fact that the change from vacuum to pressure conditions in the working fluid column, due to the presence of the compensating diaphragm, will not impart a hard blow or force to the glass in the tube 10, but rather, the diaphragm will react gradually to effect a positive and uniform pressure on the charge, thus aiding gravity in effecting extrusion from the tube and outlet, whereupon it is severed by the shears 9.

By the application of the said increased uniform pressure, the charge assumes much the shape of a purely gravity feed charge, but a given weight is extruded in a shorter time than by a purely gravity feed.

In this respect, my invention is particularly distinguished from what may be termed a positively or mechanically actuated diaphragm, which derives its movement from said external mechanism, the displacement of which is fixed for any particular impulse. Such a device imparts a quick hard force or pressure on the glass during extrusion, blowing air into the charge and causing imperfect products and varying weights.

The height $h$ to which the glass rises in the feeder tube and, therefore, the weight of the charge, may be accurately controlled in the practice of my invention by raising and lowering the feeder tube 10 with respect to the edge $a$ of the outlet 8, and by varying the stroke of the pump B, as by its screw 29.

Upon shearing the extruded charge, the regulator A again reverses the pistons 27 and 24 to create the vacuum conditions above described, whereby the glass in the outlet 8 is prevented from flowing out by gravity during the rise of glass in the tube 10.

When, due to loss of heat or other causes, it is necessary to make adjustment to maintain weight, such adjustments may be made without stopping operation by manipulating the nut 11$a$ and the screw 29.

I claim:

1. In an apparatus for separating molten glass into mold charges, a receptacle for the glass having an outlet means, a hollow adjustable member in the receptacle having an open end submerged in the glass over the outlet means, means cooperating with the hollow member for providing a closed system for a contained working fluid, and means for varying the pressure of the working fluid in the hollow member above the glass therein including a diaphragm and a column of actuating fluid for flexing the diaphragm.

2. In an apparatus for separating molten glass into mold charges, a receptacle for the glass having an outlet means, a hollow adjustable member in the receptacle having an open end submerged in the glass over the outlet means, means cooperating with the hollow member for providing a closed system for a contained working fluid, and means for varying the pressure of the working fluid in the hollow member above the glass therein including a diaphragm and a column of actuating fluid for flexing the diaphragm, said adjustable hollow member cooperating with the outlet means for controlling the flow of glass from the receptacle into the outlet means and hollow member.

3. In an apparatus for separating molten glass into mold charges, a receptacle for the glass having an outlet means, a hollow member in the receptacle having an open end submerged in the glass over the outlet means and controlling the flow of glass from the receptacle to the outlet means, means cooperating with the hollow member for enclosing a working fluid, said latter means including a diaphragm movable for varying the pressure of the working fluid in the hollow member above the glass therein, and a column of actuating fluid for flexing the diaphragm.

4. In an apparatus for separating molten glass into mold charges, a receptacle for the glass having an outlet means, a hollow member in the receptacle having an open end submerged in the glass over the outlet means and controlling the flow of glass from the receptacle to the outlet means, means cooperating with the hollow member for enclosing a working fluid, said latter means including a pneumatically actuated diaphragm movable for varying the pressure of the working fluid in the hollow member above the glass therein, and fluid means for actuating the diaphragm.

5. In an apparatus for separating molten glass into mold charges, a receptacle for the glass having an outlet means, a hollow member in the receptacle having an open end submerged in the glass over the outlet means and controlling the flow of glass from the receptacle to the outlet means, a closed system for a working fluid including a flexible diaphragm between which and the glass the working fluid is maintained, a fluid-tight casing in which the diaphragm is positioned and forming fluid-tight chambers on opposite faces of the diaphragm, and fluid means in communication with a chamber of the casing to produce alternate compression and vacuum in said chamber to flex the diaphragm and thus vary the pressure of the working fluid.

6. In an apparatus for separating molten glass into mold charges, a receptacle for the glass having an outlet means, a hollow member in the receptacle having an open end submerged in the glass over the outlet means and controlling the flow of glass from the receptacle to the outlet means, a closed column of working fluid, a column of actuating fluid, a pump acting on the actuating fluid to produce alternate compression and vacuum in the actuating fluid column, and a diaphragm disposed between the said columns of fluids and subjected to variations of pressures in the said columns and operable to effect pressure and vacuum conditions in the hollow member above the glass.

7. In an apparatus for separating material into charges, a receptacle for the material having an outlet means, a hollow member in the receptacle having an open end submerged in the material and controlling the flow of the material to the outlet means, means cooperating with the hollow member for enclosing a working fluid above the material including a diaphragm, and a column of actuating fluid for flexing the diaphragm.

EDWIN E. SLICK, Jr.